Sept. 1, 1925.
L. STURGES
1,552,017
METHOD OF SOLDERING CAN JOINTS
Filed April 13, 1923
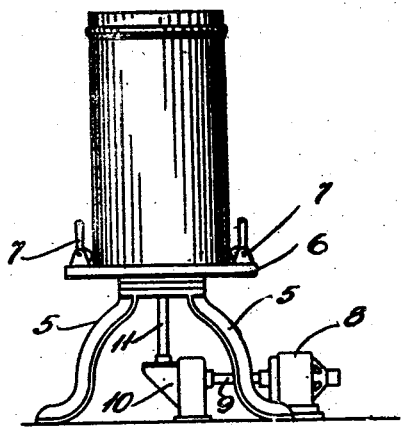
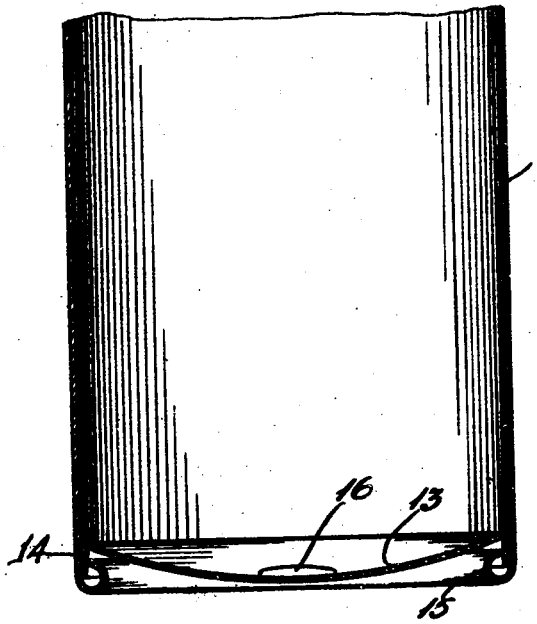
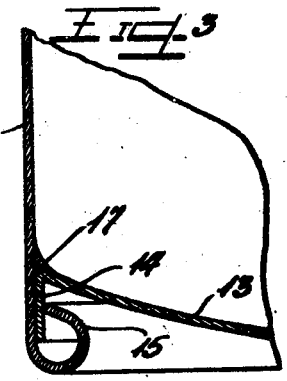
Witnesses
Inventor
LEE STURGES Patented Sept. 1, 1925.

1,552,017

UNITED STATES PATENT OFFICE.

LEE STURGES, OF ELMHURST, ILLINOIS, ASSIGNOR TO SOLGAR-STURGES MFG. CO., A CORPORATION OF ILLINOIS.

METHOD OF SOLDERING CAN JOINTS.

Application filed April 13, 1923. Serial No. 631,886.

*To all whom it may concern:*

Be it known that I, LEE STURGES, a citizen of the United States, and a resident of Elmhurst, in the county of Cook and State of Illinois, have invented certain new and useful Improvements in a Method of Soldering Can Joints; and I do hereby declare that the following is a full, clear, and exact description of the same, reference being had to the accompanying drawings, and to the numerals of reference marked thereon, which form a part of this specification.

This invention relates to improved soldering or tinning methods for use in sealing the joints of metal can bottoms and the like with special reference to milk and ice cream containers.

It is an important object of this invention to mechanically tin and seal the joints in a metal can.

It is another important object of this invention to provide a form of tinned joint having a smooth fillet completely filling the usual crack or irregular opening at the joint to produce a sanitary and easily cleaned container.

It is a further important object of this invention to provide a centrifugal machine adapted to seal the joint between the sides and bottom of a circular container whereby depositing the required amount of tin within the container and rotating it produces a perfect fillet and seal without reliance upon the skill of the workman.

It is another important object of this invention to greatly reduce the time and cost of sealing joints as compared to either dipping or manual soldering by means of a soldering iron.

Other and further important objects of this invention will be apparent from the disclosures in the drawings and specification.

The invention (in a preferred form) is illustrated on the drawings and hereinafter more fully described.

On the drawings:

Figure 1 is a front elevation of a machine for accomplishing the process of this invention with a container in position thereon;

Fig. 2 is an enlarged section of a container after dipping and before mounting on the table; and Fig. 3 is an enlarged fragmentary section of a completed joint.

As shown on the drawings:

The numeral 5 refers to a standard or frame on which a rotatable table 6 is journalled. The table carries suitable clamping and centering dogs 7, those shown being of a cam type suitable for firmly grasping the milk can, or other container to be soldered, exactly concentric with the axis of the table. Suitable driving means for the table is provided, which may be a pulley or other form of drive, such as is indicated in the figure where an electric motor 8 drives the table through a shaft 9, a gear box 10 and a vertical spindle 11.

A typical milk or ice-cream can is shown in the figures, comprising a cylindrical shell 12 and a dished bottom 13 having a peripheral flange 14 fitting within the shell 12, the lower edge 15 of which is spun over to contact inside the flange 14, both to form a seal and to retain the bottom 13.

In Figure 2, a mass of molten tin is indicated by the numeral 16; the tin is simply poured into the can in the proper quantity. In Figure 3 the tin 16 has been centrifugally cast into the joint between the flange 14 and the shell 12, forming a smooth fillet 17.

The method or process involved in this invention comprises assembling the can shell and bottom and spinning the edge of the shell. The can is then dipped in molten tin, giving a coating of tin all over, and just as the can is removed from the tin both a small quantity of excess tin is placed in the can and the can mounted concentrically on the table 6. Next the table is whirled at a rate of speed sufficient to distribute the tin around the joint by centrifugal force, forming a fillet between the body and bottom which cools into the desired shape. The speed need not be high because of the relatively heavy unit weight of the tin, the exact speed depending upon the desired contour of fillet as at higher speeds more tin is distributed on the shell and less on the bottom. Adjustments of the peripheral speed in relation to the measured quantity of tin introduced governs the fillet position in connection with the rate of acceleration of the table 6. Of course, the table and container can be rotating during the introduction of the molten tin, if so desired.

In liquid food containers a tin or tin-solder coating is preferable to a lead base solder, although, of course, it is to be understood that for other purposes the lead solder will be perfectly satisfactory, so that I desire it to be understood that this method is intended to include the use of such solder.

It is possible to accelerate quantity production of cans soldered by this process in several ways, such as controlling or cooling the can after soldering, by means of an air blast, stream of water or the like, applied, for example, by an air hose and nozzle.

This method of casting the tin produces a smooth, continuous and very compact fillet that allows perfect sterilization and cleaning of the container after emptying its contents, as the crack or joint is completely covered and the fillet is absolutely free from blow holes and lumps that cannot be cleaned out perfectly in the ordinary tinned joint.

It will be apparent that this method is applicable to any joint that is at the periphery of a circular object. In applying this method to an apertured cover, a false cover for the opening can be temporarily used, as the tin will be thrown to the periphery of the can.

I am aware that numerous details of construction may be varied through a wide range without departing from the principles of this invention and I therefore do not purpose limiting the patent granted otherwise than necessitated by the prior art.

I claim as my invention:

1. The process of tinning circular articles at their periphery, comprising dipping the article in molten tin, introducing a slight excess of molten tin, and rotating the article at a speed sufficient to uniformly distribute the excess tin.

2. The method of forming uniform fillets at circular joints in containers, comprising introducing a measured quantity of molten tin, and rotating the assembled container to distribute and compact the tin.

3. The process of producing fillets at the joint between a circular shell and a bottom, comprising placing a quantity of a molten soldering agent on the bottom, and rotating the shell and bottom about the axis of the shell.

4. The method of producing a sealed joint, comprising flanging a bottom, introducing the bottom into a circular shell, spinning the edge of the shell over said bottom flange, and centrifugally casting tin into the joint so formed on the interior of the shell and bottom.

In testimony whereof I have hereunto subscribed my name.

LEE STURGES.